Figure 1:
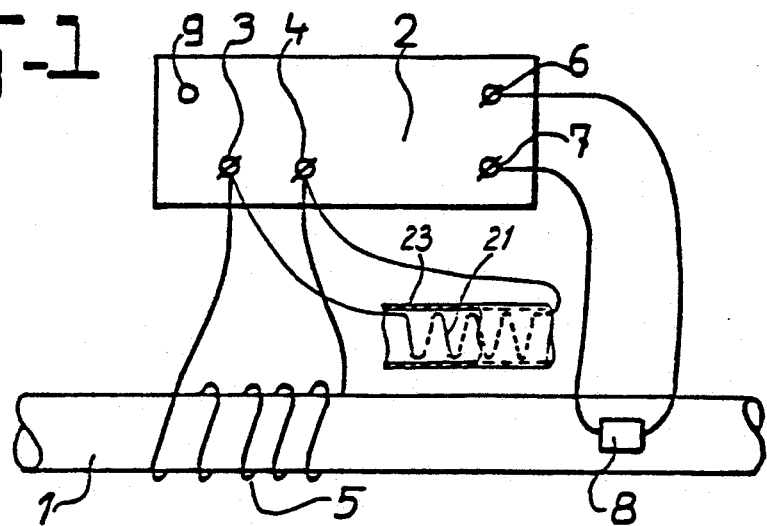

United States Patent [19]

De Baat Doelman

[11] Patent Number: 5,074,998
[45] Date of Patent: Dec. 24, 1991

[54] APPARATUS FOR TREATING LIQUID TO PREVENT AND/OR REMOVE SCALE DEPOSITS

[76] Inventor: Jan P. De Baat Doelman, Kralenbeek 1471, 1104 KJ Amsterdam, Netherlands

[21] Appl. No.: 400,774

[22] Filed: Aug. 30, 1989

[30] Foreign Application Priority Data

Sep. 2, 1988 [NL] Netherlands .......................... 8802179

[51] Int. Cl.$^5$ ............................................... C02F 1/48
[52] U.S. Cl. ........................................ 210/97; 210/222
[58] Field of Search ............... 210/97, 143, 222, 223, 210/695, 739; 204/155

[56] References Cited

U.S. PATENT DOCUMENTS

| | | | |
|---|---|---|---|
| 2,596,743 | 5/1952 | Vermeiren | 210/222 |
| 2,652,925 | 9/1953 | Vermeiren | 210/222 |
| 3,843,507 | 10/1974 | Kwan | 204/186 |
| 4,326,954 | 4/1982 | Shroyer | 210/222 |
| 4,407,719 | 10/1983 | Van Gorp | 210/695 |
| 4,865,747 | 9/1989 | Larson et al. | 210/222 |
| 4,865,748 | 9/1989 | Morse | 210/739 |
| 4,892,655 | 1/1980 | Makovec | 210/222 |

FOREIGN PATENT DOCUMENTS

| | | |
|---|---|---|
| 901884 | 3/1985 | Belgium . |
| 0091896 | 10/1983 | European Pat. Off. . |
| 3225806 | 1/1984 | Fed. Rep. of Germany . |
| 2132997 | 7/1984 | Fed. Rep. of Germany . |
| 967961 | 10/1982 | U.S.S.R. .............................. 210/222 |
| WO88/05763 | 8/1988 | World Int. Prop. O. . |

Primary Examiner—W. Gary Jones
Assistant Examiner—Matthew O. Savage
Attorney, Agent, or Firm—Young & Thompson

[57] ABSTRACT

Apparatus for treating liquid to prevent and/or remove scale deposits, made up of at least one solenoid-type electrical coil (5) for generating a magnetic field for acting on the liquid to be treated and an electrical energizing unit (2) having at least one signal output (3, 4) for connecting the ends of the at least one coil (5). The energizing unit (2) is provided with means for generating an energizing signal to be varied in frequency. The at least one coil (5) can also be sited alongside a pipe (1) instead of around a pipe (1), if necessary together with the energizing unit (2) in one and the same housing. To vary the magnetic field generated as a function of the flow rate of the liquid to be treated, the energizing unit is provided with a control input (6, 7) for connecting a flow rate transducer (8).

18 Claims, 2 Drawing Sheets

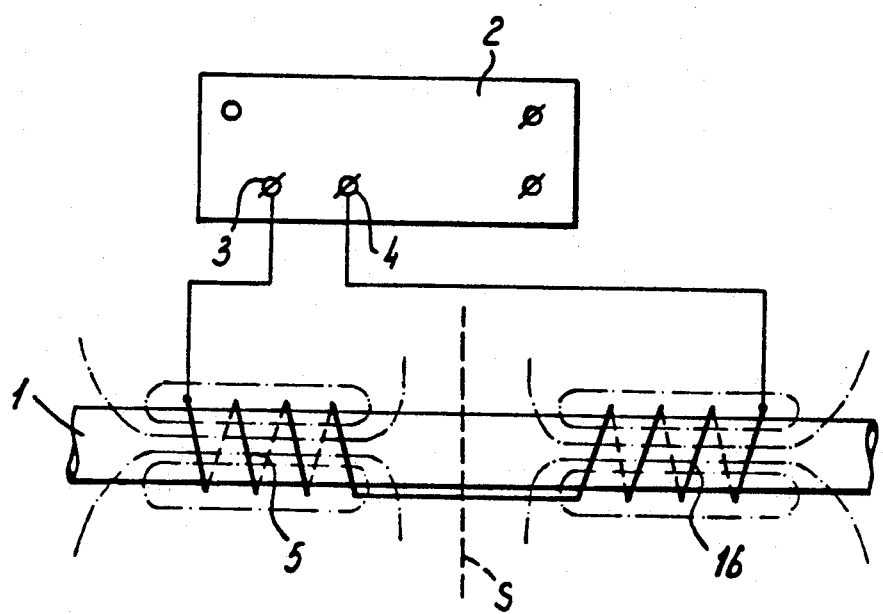
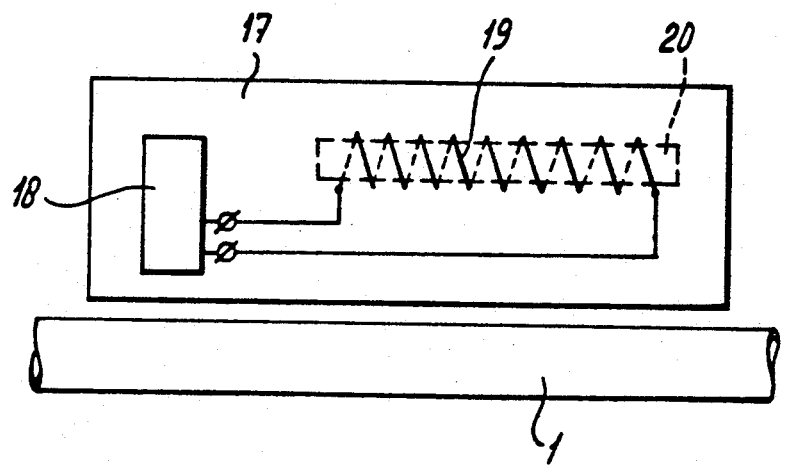

APPARATUS FOR TREATING LIQUID TO PREVENT AND/OR REMOVE SCALE DEPOSITS

The present invention relates to an apparatus for treating liquid to prevent and/or remove scale deposits, comprising at least one solenoid-type electrical coil for generating a magnetic field for acting on the liquid to be treated, and an electrical energizing unit having at least one signal output for connecting the ends of the at least one coil to energize the same with an electrical energizing signal.

An apparatus of this type is known, inter alia, from the U.S. Pat. No. 2,596,743.

Even the presence of a small percentage of impurities such as ions of calcium and magnesium in a liquid, for example water, gives rise to the formation of scale or voluminous precipitate. Calcium sulphate, calcium silicate and magnesium silicate form scale because, as the liquid in which they occur evaporates, the concentration of these salts increases and approaches the saturation point at which the salts crystallize out and attach themselves to a wall. Calcium carbonate, for example, forms a very soft scale or sometimes, a precipitate. The most persistent form of scale is calcium sulphate which adheres to the metal walls of pipes, boilers etc. so strongly that the latter have to be put out of use in order to remove the scale.

The occurrence of scale in, for example, steam boilers results in a reduced heat transmission and therefore in a higher fuel usage, in addition to the possibility of pipe blockage. Even a layer of scale of approx. 0.2 mm can give rise to local overheating and damage the boilers.

The said ions of calcium and magnesium and any manganese, iron and aluminium impurities are also very detrimental to domestic usage because they react with soap as a result of the formation of calcium, magnesium, iron and aluminium salts which are insoluble and form a sticky substance on materials which are being washed in water which contains these impurities.

As is known, a moving charge in a magnetic field experiences a Lorentz force which depends on the applied magnetic field strength, the quantity of charge, the displacement velocity of the charge and the direction of the magnetic field lines with respect to the displacement direction of the charge. If the liquid contaminated with the said elements is now subjected to a magnetic field, the liquid molecules, for example water molecules, are oriented, as a result of which the said impurities, in particular the ions of calcium and magnesium, come out of solution and can be trapped, for example, by means of a filter to be placed in the liquid flow, with the result that no scale is consequently formed. The known apparatus provides for a solenoid-type electrical coil through the internal space of which, inter alia, the liquid to be treated is passed and which is energized with a direct current, an alternating current of fixed frequency or a pulsating current.

European Patent Application EP-A-0,091,896 discloses, in this connection, a tubular ring through which the liquid is passed in order to drive it continuously into such a turbulent state in the region of the coil that it is possible for an energizing current with a fixed adjustment to be adequate.

In common with U.S. Pat. No. 2,596,743, this involves, however, a structure which has to be incorporated in a pipe of a system, which may present installation problems and be expensive, particularly in the case of existing pipe systems or when replacing the apparatus, and for which it may be necessary to put the system out of operation. In practice it has furthermore been found that the efficient operation of the known apparatuses is concomitantly dependent on the flow rate of the liquid to be treated.

The invention is consequently based in the first instance on the object of providing an apparatus of the type mentioned in the introduction with which a satisfactory, efficient operation over a desired range of flow rates of the liquid to be treated is achieved without the necessity of structures which have to be incorporated in a pipe through which the liquid flows.

According to the invention, this is achieved in that the energizing unit is provided with means for generating an energizing signal to be varied in frequency. As a result of this, it is possible, if the flow rate increases, to increase the frequency of the energizing signal so that at higher flow rates a magnetic action can be exerted on the liquid correspondingly more frequently per unit of time, and vice versa. It has been found that in this case the coil for generating the magnetic field for achieving a desired action can be fitted outside an existing pipe through which the liquid to be treated is flowing without said pipe having to be disconnected.

A further embodiment of the apparatus according to the invention has the characteristic that the energizing unit is provided with means for frequency-modulating the energizing signal. Such a frequency-modulated energizing signal provides a magnetic field which produces an average effect which is satisfactory with time for various flow rates.

An embodiment of the invention which can be used for a large range of flow rates has the characteristic that the means for frequency-modulating the energizing signal are equipped to generate a signal varying in frequency between approximately 700 and 3000 Hz.

An embodiment of the invention suitable for obtaining more optimum results has the characteristic that at least one transducer for connection to a control input of the energizing unit is provided to generate a control signal dependent on the flow rate of the liquid in order to vary the frequency of the energizing signal to match the variation in the flow rate.

It has furthermore been found that, in order to exert a Lorentz force of suitable magnitude on the moving charges with the magnetic field, the magnetic field has to become stronger with decreasing liquid flow rate, and conversely, that the magnetic field has to decrease as the flow rate increases. In the known apparatus as disclosed by the said US Patent which operates with a predetermined fixed magnetic field strength, it may even happen that, if the liquid velocity drops below a certain minimum value, the useful effect is zero, with all the disadvantageous consequences thereof. To make the magnetic field so strong that a good effect is in fact obtained at such low flow rates is not advantageous because it has been found that at higher flow rates the Lorentz force on the moving charges is then proportionately too large, as a result of which the useful effect is again less.

The strength of the magnetic field generated is determined not only by the number of windings and the dimensions of the electrical coil, but also by the amplitude of the energizing signal. In order to also achieve a magnetic field strength matched to the flow rate of the liquid, a further embodiment of the apparatus according to the invention has the characteristic that the energizing unit is provided with means for varying the amplitude of the energizing signal.

An automatic matching of the amplitude of the energizing signal to the flow rate of the liquid is achieved in yet a further embodiment of the apparatus according to the invention in that at least one transducer for connection to a control input of the energizing unit is provided to generate a control signal dependent on the flow rate of the liquid in order to vary the amplitude of the energizing signal inversely to the variation in the flow rate. This embodiment has the advantage that, during operation by a user, set values do not have to be adjusted to a change in the flow rate of the liquid.

A flowmeter incorporated in the liquid flow can be used as transducer. However, the preference is for transducers which can be fitted outside a pipe or system without structural adaptations thereof. Transducers suitable for this purpose are in practice known per se. For example, transducers inductively or thermally coupled to the liquid flow.

A still more optimum effect is obtained in yet a further embodiment of the invention in that the means for varying the amplitude of the energizing signal are equipped to keep the product of amplitude and flow rate constant within the modulation limits of the energizing unit.

As already stated above, even a thin layer of scale an give rise to damage to, for example, boilers as a result of reduction in the heat transmission. In the case of boilers for, for example, generating electricity, such damage can give rise to the shutdown of the electricity production, which may in practice have very extensive, disadvantageous consequences. In particular, in these applications it is important that the operation of the apparatus according to the invention can be monitored.

For this purpose, an embodiment of the invention has the characteristic that the energizing unit is provided with means for indicating the state of energization of the apparatus. Yet a further embodiment also has the characteristic for this purpose that the energizing unit is provided with warning means for indicating that the apparatus is in the unenergized state.

In order to guarantee the operation of the apparatus in the event of a fault in the power supply or in order to achieve an operation independent of an external power source, which may, for example, be necessary in places where, for example, connection to the public electricity mains is not possible, an embodiment of the apparatus according to the invention has the characteristic that the energizing unit is provided with an on board electrical power source means. For this purpose, use may be made of batteries, rechargeable batteries, solar cells and the like. For the purpose of illustration, in apparatuses used in practice, desired results are obtained with an energizing current of a few tenths of a microampere with a coil of only a few windings.

The treatment of the liquid with the apparatus according to the invention is intensified in yet a further embodiment in that the at least one coil is made up of a plurality of coils situated at a distance from one another in the flow direction of the liquid to be treated, which coils are connected to the energizing unit in order to generate mutually oppositely directed magnetic fields by means of at least two coils.

The use of mutually oppositely directed magnetic fields achieves the result that, at the plane of separation of the two fields, the magnetic field lines are directed virtually transversely to the liquid flow and, as a consequence, a maximum Lorentz force acts on the liquid molecules.

It is pointed out that the Belgian Patent Specification 901,884 discloses an apparatus for preventing scale deposits in which at least one coil is used which has to be fitted round a pipe containing liquid to be treated. However, this involves a so-called "open system" in which only one end of the at least one coil is connected to an energizing unit, the other end of the coil being free. This is in contrast to the apparatus according to the invention in which both ends of the at least one coil are connected to the energizing unit. Furthermore, a frequency-modulated energizing signal is not used.

It has been found in practice that such an open system is disadvantageous in a number of aspects. Firstly, the physical distance between the energizing unit and the coil has to be short in order to achieve an adequate effect over the entire length of the coil. This can be troublesome during installation. In addition, the coil forms an open LC circuit with respect to earth, as a result of which the current exhibits a peak in the coil and then rapidly dies out in the case of a pulsating energizing signal. The decay of the current in this manner causes interference signals far up into the high-frequency range, as a result of which interference in other electronic equipment, such as, for example, measuring and regulating apparatus, and radio and TV receivers is not ruled out. In particular, the possible interference with measuring and regulating equipment may in practice have very detrimental consequences. Furthermore, there is no magnetic field present between the peaks in the energizing current, with the result that the apparatus does not have any useful effect during these periods of time.

These disadvantages are avoided as far as possible with the apparatus according to the invention which is constructed as a closed system, that is to say, in which the two ends of the at least one electrical coil are connected to the energizing unit In contrast to the disclosures by, inter alia, the already mentioned publications, it has been found that the at least one coil for generating a magnetic field for acting on the liquid to be treated does not necessarily have to encompass said liquid or the pipe through which the liquid is flowing.

Instead of fitting the at least one coil around a pipe through which the liquid to be treated is flowing, an embodiment of the invention has the characteristic that the at least one coil is provided with a protective sleeve for placing the at least one coil with its longitudinal axis as parallel as possible to a pipe through which the liquid to be treated is flowing.

In addition to a relatively simple installation, this also reduces the risk of a metallic pipe being attacked as a consequence of galvanic action in the event of damage to the insulation of the coil. The use of two coils to be mounted on top of one another around a pipe, of which coils the coil resting directly against the pipe is held at a negative potential with respect to the pipe (earth) by means of rectifying means, is disclosed in the International Patent Application WO-A-8,805,763 with the same purpose. It will be clear that this method is both more cumbersome and also less reliable than providing the at least one coil according to the invention with a protective sleeve and siting it adjacent to the pipe.

The useful effect of the coil is barely less if it is sited alongside a pipe instead of the pipe being encompassed by the coil because the greatest effect (Lorentz force) is produced by the magnetic field lines directed transversely to the liquid flow, in this case the pipe through which the liquid is flowing, which effect is in both cases virtually the same. In some cases, even a better effect may be expected as a result of a more favourable field distribution if the at least one coil is sited alongside a pipe.

An apparatus based on this realization for treating a liquid to prevent and/or remove scale deposits, comprising at least one solenoid-type electrical coil for generating a magnetic field for acting on the liquid to be treated and an electrical energizing unit having at least one signal output for connecting the ends of the at least one coil to energize the same with an electrical energizing signal has the characteristic that the at least one coil and the energizing unit are accommodated in one and the same housing.

The accommodation, according to the invention, of the energizing unit and the at least one coil in one housing eliminates the necessity for the separate installation of a coil and energizing unit. Particularly when used in environments in which the strictest requirements with respect to the liquid to be treated do not apply, but where the most important thing is in fact convenience of use and installation, for example for domestic use, such an apparatus is of advantage, in particular, in combination with its own power supply such as a battery.

The effect of the coil may, according to another embodiment, be increased in that the at least one coil is wound on a core of magnetic material, for example, a core of magnetically "soft" material such as soft iron or of ferrite in connection with the lower eddy-current losses thereof at higher frequencies.

Means are furthermore provided for placing the housing in the longitudinal direction of a pipe in a manner such that the longitudinal axis of the at least one solenoid-type coil is situated as parallel as possible to the liquid flow. The means may be equipped, in particular, for fixing the housing to a pipe.

The invention also relates to an energizing unit which can be used in combination with a coil and/or a transducer for the flow rate of the liquid to be treated.

Figure 2:
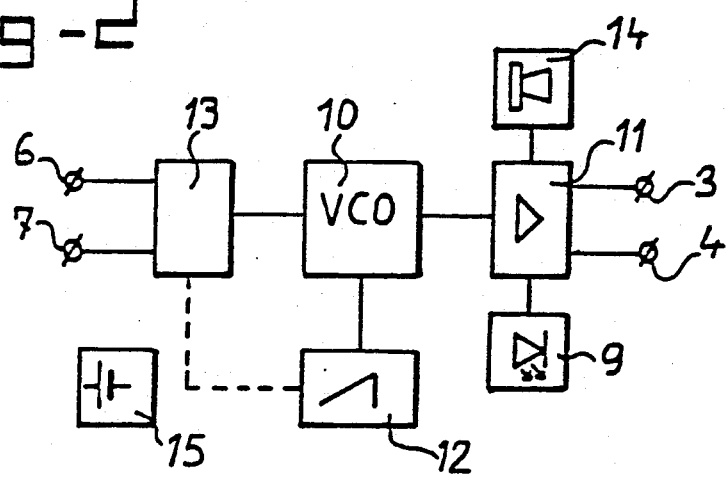
Figure 3:
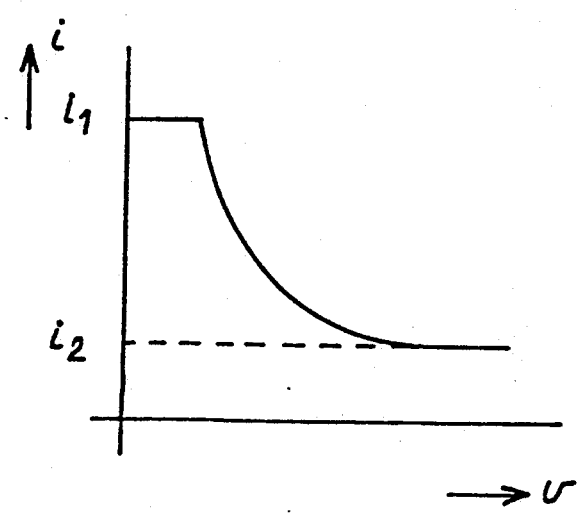

The invention is described in more detail below with reference to an exemplary embodiment and the drawing, wherein:

FIG. 1 shows diagrammatically the siting and connection of an energizing unit to a single coil and transducer, FIG. 2 shows, in block diagram form, a possible electrical embodiment of the energizing unit according to the invention, FIG. 3 illustrates graphically the relationship between the amplitude of the energizing signal of the coil and the flow rate of the liquid to be treated, FIG. 4 shows diagrammatically the siting and connection of two coils, and FIG. 5 shows diagrammatically the siting of an apparatus in which the coil and the energizing unit are accommodated in the same housing.

FIG. 1 shows an application of the apparatus according to the invention in which the liquid to be treated, for example water, flows through a pipe 1. A solenoid-type coil 5 of insulated electrically conducting wire wound externally around the pipe 1 is fitted on the signal output terminals 3, 4 of an energizing unit 2. Connected to the control signal input terminals 6. 7 of the energizing unit 2 is a transducer 8 which generates a control signal dependent on the flow rate of the liquid in the pipe 1.

The energizing unit 2 is furthermore provided with an indicator lamp 9 which lights up provided an energizing current is flowing through the coil 5.

FIG. 2 shows, in block diagram form, a possible embodiment of the energizing unit 2. The central section is formed by a voltage controlled oscillator 10 which is known per se and is referred to in the English-language specialist literature by the abbreviation VCO ("voltage controlled oscillator"), to the output of which a driver stage 11 is connected which has the signal output terminals 3, 4 for connecting the electrical coil 5. The frequency of the VCO 10 is controlled with the aid of a sawtooth generator 12. It has been found that a desired useful effect can be achieved for virtually all the liquid flow rates encountered in practice with an energizing signal varying steadily in frequency between 700 and 3000 Hz.

To vary the amplitude and, if necessary, the frequency of the alternating current signal generated by the VCO 10, a control stage 13 is provided which has the control signal connection terminals 6, 7 for supplying the control signal from the transducer 8. The transducer 8 may comprise a standard flowmeter which should be incorporated in the liquid flow or which can be fitted outside the pipe 1 and generates an output signal dependent on the flow rate. The control stage 13 processes such a signal in a manner such that, if the flow rate of the liquid increases, the amplitude of the output signal of the VCO 10 or the driver stage 11 is reduced. If the flow rate decreases, the output signal of the VCO or the driver stage is increased in amplitude.

The broken connecting line between the control stage 13 and the sawtooth generator 12 indicates that, if necessary, the frequency of the VCO 10 may also be controlled as a function of the flow rate. In this case, an adjustable voltage source could also be used instead of a sawtooth generator.

It is evident that the driver stage 11 can be provided with a plurality of signal outputs for connecting a plurality of coils 5. A light-emitting diode LED 9 which lights up during the time that a current flows via the signal output connecting terminals 3, 4 is furthermore connected to the driver stage 11. In addition to this optical indicating means, an acoustic signal provider 14 is also connected to the driver stage 11 and this only emits a signal if no current is flowing through the signal output connecting terminals 3, 4 during operation, for example, as a consequence of an open circuit in the coil 5. It is emphatically pointed out that the LED 9 and the signal provider 14 can be fitted optionally and if necessary, may also be replaced by other means, for example for indicating the operation of the apparatus in a control room, if necessary radiographically. The control stage 13 for varying the amplitude of the output signal of the VCO 10 or the driver stage 11 is also optional.

It has been found that excellent operation is obtained if the driver stage 11 delivers a square-wave alternating current signal.

The energizing unit is provided with the necessary electrical power with the aid of a supply unit 15. The supply unit 15 is constructed in a manner such that the energizing unit is able to function either connected to the electricity mains or independently, for example by means of, inter alia, a rechargeable battery, batteries or solar cells. Although not shown, the driver stage 11, sawtooth generator 12 and the control stage 13 may be provided, if necessary, with means for presetting the desired values of the parameters and may be constructed as a single integrated circuit.

The circuit shown in block diagram form can be constructed with components obtainable commercially.

FIG. 3 shows graphically the preferred variation of the level of the energizing current i through the coil 5 as a function of the flow rate v of the liquid to be treated. The current level is at the same time limited between a maximum limiting value $i_1$ and a minimum limiting value $i_2$. Between these modulation limits $i_1$, $i_2$, the product of the flow rate and the current level v.i is constant in order to achieve an optimum effect. Because of the illustrated nature of the Figure, no specific values or units are specified.

It will be clear that, instead of a voltage controlled oscillator, other electronic circuits known per se for obtaining a frequency-modulated alternating current signal can also be used.

FIG. 4 shows diagrammatically a manner in which two or more coils 5, 16 can be used to treat a liquid in a pipe 1 according to the invention. In the situation shown, the coils are connected in series to the signal output connecting terminals 3, 4 of the energizing unit 2. As a result of the opposite winding direction, oppositely directed magnetic fields are generated, a few field lines of which are diagrammatically shown by chain lines. It can be clearly seen that, in the vicinity of the imaginary plane of separation S indicated by the broken line, the field lines of the two fields are directed more transversely to the pipe 1 than, for example, at the ends of the coils 5 and 16 facing away from the plane of separation S. Consequently, the liquid molecules are on average subjected to a greater Lorentz force effect in the vicinity of the plane of separation.

It will be clear to the person skilled in the art that coils having the same winding direction may also be used, in the case of a series connection of two coils, the end, situated for example downstream in the flow direction of the liquid to be treated, of one coil being connected to the end, situated downstream, of the adjacent other coil and both ends situated upstream being connected to the signal output terminals 3, 4 of the energizing unit 2. Obviously, the coils can also be connected appropriately in parallel to the signal output terminals 3, 4. The possibilities also include combinations of parallel and series connection. Series connection has the advantage that the coils can be manufactured jointly from one piece of electrically conducting wire without welding and the like. A mutual spacing of the coils of up to a few decimetres is found in practice to be quite satisfactory.

FIG. 5 shows diagrammatically a housing 17 in which an energizing unit 18, arbitrarily selected per se, and a solenoid-type coil 19 are accommodated as a single entity. Preferably, the energizing unit 18 is constructed in accordance with FIGS. 2 and 3 and as discussed above. To intensify the magnetic field generated by the coil 19, the latter can be wound on a core 20 of magnetic material such as soft iron or magnetically soft ferrite, as is illustrated by the broken lines.

The housing 17 is furthermore provided with means for siting the coil 19 with its longitudinal axis parallel to the pipe 1, such as, for example, suspension eyes, holes or fixing means situated in a wall of the housing. Preferably, the housing 17 is provided with pipe clips 24, a self-locking ring or the like for fixing the housing 17 directly on the pipe 1.

It will be clear that the coils shown in FIGS. 1 and 4 may also be fitted alongside, for example in their own protective sleeve, instead of around the pipe, shown schematically in FIG. 1, wherein a coil 21 is wound within protective sleeve 23. In addition to a simpler installation, this reduces the risk of corrosion as a result of galvanic action between the metal of the coil, for example copper, and a pipe of, for example, cast iron in the event of damage to the insulation of the wire of the coil. Obviously, the coil must not per se come into contact with the pipe.

The particles liberated from solution, in particular, lime particles may in general be effectively trapped in the pipe 1 by incorporating one or more fine-mesh (mesh size a few microns) replaceable or cleanable liquid filters in the pipe 1 viewed in the downstream direction behind the coil 5 and/or the coil 16.

Many variations and additions may furthermore be made by a person skilled in the art to the apparatus according to the invention without departing from the scope and idea thereof.

I claim:

1. An apparatus for treating liquid to prevent and/or remove scale deposits, comprising at least one solenoid-type electrical coil for generating a magnetic field for acting on the liquid to be treated, said at least one coil having connecting ends to energize the same with an electrical energizing signal, and an electrical energizing unit having at least one signal output connected to the ends of said at least one coil, said energizing unit having generating means for generating a continuously frequency varied energizing signal independently of the flow rate of the liquid to be treated.

2. An apparatus according to claim 1, wherein said generating means frequency-modulates the energizing signal.

3. An apparatus according to claim 1, wherein said generating means generates a signal continuously varying in frequency between about 700 and 3000 Hz.

4. An apparatus according to claim 1, wherein said generating means includes control input means for varying the amplitude of the energizing signal, wherein at least one transducer means for generating a control signal dependent on the flow rate of the liquid to be treated is connected to said control input means in order to vary the amplitude of the energizing signal inversely to the flow rate of the liquid.

5. An apparatus according to claim 4, wherein said control input means includes means for keeping the product of amplitude and flow rate constant.

6. An apparatus according to claim 4, wherein said transducer is a flow meter immersed in the liquid flow.

7. An apparatus according to claim 4, wherein said transducer is a flow meter disposed outside the liquid flow.

8. An apparatus according to claim 1, wherein the energizing unit is provided with onboard electrical power source means.

9. An apparatus according to claim 1, wherein said at least one coil has a longitudinal axis and is provided with a protective sleeve for positioning said coil with its longitudinal axis parallel to a pipe through which the liquid to be treated is flowing.

10. An apparatus for treating liquid to prevent and/or remove scale deposits, comprising at least one solenoid-type electrical coil for generating a magnetic field for acting on the liquid to be treated, said at least one coil having connecting ends to energize the same with an electrical energizing signal, and an electrical energizing unit having at least one signal output connected to the ends of said at least one coil, said energizing unit being provided with frequency control input means for generating an energizing signal to be varied in frequency, wherein at least one transducer means for generating a control signal dependent on the flow rate to be treated is connected to said frequency control input means to vary the frequency of the energizing signal in dependence with the flow rate of said liquid.

11. An apparatus according to claim 10, comprising amplitude control input means for varying the amplitude of the energizing signal, said amplitude control input means being connected to said at least one transducer means to vary the amplitude of the energizing signal inversely to the variation in the flow rate of the liquid to be treated.

12. An apparatus according to claim 11, wherein said amplitude control input means includes means for keeping the product of amplitude and flow rate constant.

13. An apparatus according to claim 10, wherein said transducer means is a flow meter immersed in the liquid flow.

14. An apparatus according to claim 10, wherein said transducer means is a flow meter disposed outside the liquid flow.

15. An apparatus according to claim 10, wherein the energizing unit is provided with onboard electrical power source means.

16. An apparatus according to claim 10, wherein said at least one coil has a longitudinal axis and is provided with a protective sleeve for positioning said coil with its longitudinal axis parallel to a pipe through which the liquid to be treated is flowing.

17. An apparatus for treating liquid in a pipe to prevent and/or remove scale deposits, comprising a housing, at least one solenoid-type electrical coil for generating a magnetic field for acting on the liquid to be treated, said at least one coil having connecting ends to energize the same with an electrical energizing signal, and an electrical energizing unit having at least one signal output connected to the ends of said at least one coil, wherein said at least one coil and said energizing unit are disposed in the housing, said housing having means for fixing said housing alongside said pipe said fixing means being configured so that said coil extends parallel to said pipe and does not encompass said pipe.

18. An apparatus according to claim 17, wherein said at least one coil is wound on a core of magnetic material.

* * * * *